United States Patent [19]

de la Cuesta Sheppard

[11] Patent Number: 6,011,106
[45] Date of Patent: Jan. 4, 2000

[54] HIGH-BUILD LOW-SAG AQUEOUS COATING COMPOSITION

[75] Inventor: Aurelia de la Cuesta Sheppard, Newtown, Pa.

[73] Assignee: Rohm and Haas Company, Philadelphia, Pa.

[21] Appl. No.: 09/160,412

[22] Filed: Sep. 25, 1998

Related U.S. Application Data

[60] Provisional application No. 60/060,272, Sep. 29, 1997.

[51] Int. Cl.$^7$ ................ C08J 3/00; C08K 3/20; C08L 75/00; B05D 3/02
[52] U.S. Cl. ............ 524/507; 427/372.2; 427/385.5; 524/591; 524/839; 524/840
[58] Field of Search .................... 524/507, 591, 524/839, 840; 427/372.2, 385.5

[56] References Cited

U.S. PATENT DOCUMENTS 5,262,464  11/1993  Koevenig et al. .................. 524/413

OTHER PUBLICATIONS

T.C. Thibeault, P.R. Sperry, and E.J. Schaller, Chapter 20, "Effect of Surfactants and CoSolvents on the Behavior of Associative Thickeners in Latex Systems" in "Water–Soluble Polymers", No. 213, Advances in Chemistry Series, ed. J.E. Glass, American Chemical Soc., Wash, D.C. (1986).
"Exxate Solvents" brochure, Exxon Chemical Co., (undated).
W. Gunter, *"Proceedings of the Water–Borne and Higher–Solids Coatings Symposium"*, 1988, 265–296 1988.

*Primary Examiner*—Patrick D. Niland
*Attorney, Agent, or Firm*—Ronald D. Bakule

[57] ABSTRACT

A method for providing a high-build, low-sag coating by applying an aqueous coating composition including a waterborne polymer, preferably an emulsion polymer, having a glass transition temperature from 0 C. to 70 C., a hydrophobically modified polyurethane thickener, and a coalescent having solubility in water of less than 3 weight % and evaporation rate of at least 0.01(butyl acetate evaporation rate=1.0) to a substrate in a single coat having a thickness of at least 0.05 mm. when dried, and drying, or allowing to dry, the applied coating is provided. The aqueous composition and a curable composition are also provided.

6 Claims, No Drawings

HIGH-BUILD LOW-SAG AQUEOUS COATING COMPOSITION

This is a nonprovisional application of prior pending provisional application Ser. No. 60/060,272 filed Sep. 29, 1997.

This invention relates to a high-build low-sag aqueous coating composition. More particularly, this invention relates to an aqueous coating composition including a waterborne polymer, a hydrophobically modified urethane thickener, and a coalescent having solubility in water of less than 3 weight % and evaporation rate of at least 0.01 (butyl acetate evaporation rate=1.0). And the invention relates to a method for providing a high-build low-sag coating with an aqueous coating composition containing a waterborne polymer, a hydrophobically modified urethane thickener, and a coalescent having solubility in water of less than 3 weight % and evaporation rate of at least 0.01(butyl acetate evaporation rate=1.0).

The present invention serves to provide a high-build aqueous coating composition defined herein as an aqueous coating composition which may be applied in a single thick coat (such that the dry film thickness is greater than 0.05 mm) which exhibits relatively low tendency to sag or flow, so not to cause visual imperfections in the dried coating, while the coating is still wet ("low-sag" herein) and relatively rapid drying. The high build aqueous coating composition includes a waterborne polymer binder, a hydrophobically modified urethane thickener, and a relatively fast evaporating hydrophobic coalescent.

U.S. Pat. No. 5,262,464 discloses an aqueous coating composition containing an aqueous anionic polyacrylate or polyurethane dispersion obtainable by dispersing the polymer in water, a phosphorous containing pigment, and additives selected from the group consisting of solvents, surfactants, etc. Primer compositions are applied at a dry film thickness of 0.038 mm–0.076 mm (1.5–3 mils). The solvents disclosed include a coalescent having solubility in water of less than 3 weight % and evaporation rate of at least 0.01(butyl acetate evaporation rate=1.0) (EXXATE® 800).

W. Gunter ("Evaluation of New Generation Coalescing Agents for Industrial Acrylic Latices", Proceedings 15th Water-Borne & Higher-Solids Coatings Symposium, New Orleans, La., pages 265–296(1988)) discloses water-borne coatings containing emulsion polymer binders, certain associative emulsion polymer thickeners, and alkyl acetate coalescers having solubility in water of less than 3 weight % and evaporation rate of at least 0.01(butyl acetate evaporation rate=1.0).

The problem faced by the inventors is the provision of a composition and a method for applying relatively thick coatings in one coat (high-build) which exhibit low sag while drying, desirably even when applied to vertical surfaces so as to provide sufficient protection to the substrate while avoiding multiple coating/drying steps which are time-consuming and costly. Previous compositions provide inferior performance in this regard.

In a first aspect of the present invention there is provided an aqueous coating composition including a waterborne polymer having a glass transition temperature from 0 C. to 70 C., a hydrophobically modified urethane thickener, and a coalescent having solubility in water of less than 3 weight % and evaporation rate of at least 0.01(butyl acetate evaporation rate=1.0).

In a second aspect of the present invention there is provided a method for providing a high-build low-sag coating including: forming an aqueous coating composition including a waterborne polymer having a glass transition temperature from 0 C. to 70 C., a hydrophobically modified urethane thickener, and a coalescent having solubility in water of less than 3 weight % and evaporation rate of at least 0.01(butyl acetate evaporation rate=1.0); applying the composition to a substrate in a single coat having a thickness of greater than 0.05 mm when dried; and drying, or allowing to dry, the applied coating.

This invention relates to an aqueous coating composition suitable for high-build low-sag coatings and a method for providing a high-build low-sag coating.

The aqueous coating composition contains a waterborne polymer having a glass transition temperature from 0 C. to 70 C. The waterborne polymer contains at least one copolymerized ethylenically unsaturated monomer such as, for example, a (meth)acrylic ester monomer including methyl acrylate, ethyl acrylate, butyl acrylate, 2-ethylhexyl acrylate, decyl acrylate, methyl methacrylate, butyl methacrylate, hydroxyethyl methacrylate, hydroxypropyl methacrylate, aminoalkyl (meth)acrylate; styrene or substituted styrenes; butadiene; vinyl acetate or other vinyl esters; vinyl monomers such as vinyl chloride, vinylidene chloride, N-vinyl pyrollidone; (meth)acrylonitrile and (meth)acrylamide. The use of the term "(meth)" followed by another term such as acrylate or acrylamide, as used throughout the disclosure, refers to both acrylates and acrylamides and methacrylates and methacrylamides, respectively.

The waterborne polymer also contains from 0% to 15%, preferably from 1% to 5%, of a copolymerized monoethylenically-unsaturated acid monomer, based on the dry weight of the polymer, such as, for example, acrylic acid, methacrylic acid, crotonic acid, itaconic acid, sulfoethyl methacrylate, phosphoroethyl methacrylate, fumaric acid, maleic acid, monomethyl itaconate, monomethyl fumarate, monobutyl fumarate, and maleic anhydride.

The waterborne polymer used in this invention is substantially thermoplastic, or substantially uncrosslinked, when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,3-butylene glycol dimethacrylate, 1,6-hexanedioldiacrylate, and divinyl benzene may be used. It is important, however, that the quality of the film formation is not materially impaired. Chain transfer agents such as, for example, alkyl mercaptans may be used in order to moderate the molecular weight of the polymer.

The polymerization techniques used to prepare waterborne polymers such as, for example, emulsion polymers, aqueous colloidal polymeric dispersions, solution polymers dissolved in water or in a predominantly aqueous medium, and aqueous polymer suspensions are well known in the art. Emulsion polymers are preferred. In the preparation of emulsion polymers conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually up to 6% by weight, based on the weight of total monomer. Either thermal or redox initiation processes may be used. Conventional free radical initiators may be used such as, for example, hydrogen peroxide, t-butyl hydroperoxide, and ammonium and/or alkali persulfates, typically at a level of 0.05% to 3.0% by weight, based on the weight of total monomer. Redox systems using the same initiators coupled with a suitable reductant such as, for example, sodium bisulfite may be used at similar levels. Chain transfer agents such as, for example, mercaptans may be used in an amount effective to provide lower molecular weights.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactant, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

The emulsion polymer typically has an average particle diameter of 30 nanometers to 500 nanometers. Processes yielding polymodal particle size distributions such as those disclosed in U.S. Pat. Nos. 4,384,056 and 4,539,361, for example, may also be employed.

The glass transition temperature ("Tg") of the waterborne polymer is from 0 C. to 70 C., as measured by differential scanning calorimetry (DSC) using the mid-point in the heat flow versus temperature transition as the Tg value.

In an another aspect of the present invention the aqueous coating composition may additionally contain a curing agent; the curing agent may be a compound, oligomer, or polymer which contains at least two functional groups capable of reacting with functional groups on the waterborne polymer. In this aspect the waterborne polymer contains at least two first functional groups and the aqueous coating composition further contains a curing agent containing at least two second functional groups, the first functional groups being reactive with the second functional groups. For example, if the waterborne polymer contains hydroxyl groups, the curing agent may contain isocyanate groups; if the waterborne polymer contains carboxylic acid groups, the curing agent may contain carbodiimide groups; or if the waterborne polymer contains acetoacetyl groups, the curing agent may contain primary or secondary amine groups. The reaction between the waterborne polymer and the curing agent may occur at ambient or at elevated temperatures with or without a catalyst before, during, or after the application of the aqueous coating composition to a substrate, thereby forming a cured or crosslinked composition. However, such reaction before or during the application of the aqueous coating composition to a substrate must be effected such that the quality of the film formation is not materially impaired.

The aqueous coating composition contains a hydrophobically modified urethane thickener. A hydrophobically modified urethane thickener as used herein refers to hydrophobically-modified polyurethane rheology modifiers or thickeners. Hydrophobically modified urethane thickener are referred to in the art as associative thickeners, so-called because the mechanism by which they thicken is believed to involve hydrophobic associations between the hydrophobic moieties, typically hydrocarbon groups containing at least six carbon atoms, on the thickener molecules themselves and/or with other hydrophobic surfaces.

Hydrophobically modified urethane thickeners are well-known in the art and are widely commercially available such as, for example, ACRYSOL® RM-825, ACRYSOL® RM-8W, ACRYSOL® RM-12W, ACRYSOL® SCT-275, RHEOLATE® 225 and TAFIGEL® PUR 60. Hydrophobically modified urethane thickeners are water-soluble or water/water-miscible solvent-soluble polyurethanes which contain hydrophobic groups (at least two hydrocrbon groups having at least seven carbon atoms in each) and hydrophilic groups (sufficient to ensure solubility in water or water/water-miscible solvent blends). Their preparation has been described, for example, in U.S. Pat. Nos. 4,079,028 and 5,281,654. They may be prepared, for example, by the reaction of a polyether polyol such as, for example, polyethylene glycol, a polyisocyanate, and a monofunctional hydrophobic organic compound in a water-miscible solvent. Hydrophobically modified urethane thickeners typically have weight average molecular weights, as measured by gel permeation chromatography, from 10,000 to 50,000. Hydrophobically modified urethane thickeners are typically used at levels of 0.2 to 15.0 dry pounds per 100 gallons of aqueous coating.

In addition to the hydrophobically modified urethane thickener, the aqueous coating composition may contain lesser amounts of other thickeners such as, for example, cellulosics, hydrophobically modified cellulosics, alkali-soluble acrylic polymers, inorganic clays, titanium chelates, hydrophobically modified polyacrylamides, and hydrophobically modified alkali-soluble emulsion polymers. In any event, the dry weight of the hydrophobically modified urethane thickener exceeds the total dry weight of all other thickeners incorporated.

The aqueous coating composition contains a coalescent, that is, a volatile organic compound capable of softening the waterborne polymer so as to facilitate film formation, having solubility in water of less than 3 weight % and evaporation rate of at least 0.01(butyl acetate evaporation rate=1.0). Physical properties of some coalescents used in conventional coatings compositions are presented in Table 1. By solubility in water herein is meant the solubility in water at 25 C. By evaporation rate herein is meant the ratio of the evaporation rate of the test coalescent at 25 C. relative to the evaporation rate of butyl acetate. The coalescent having solubility in water of less than 3 weight % and evaporation rate of at least 0.01(butyl acetate evaporation rate=1.0) is typically used at a level of 4% to 40%, by weight based on the dry weight of the waterborne polymer. The aqueous coating composition may also contain coalescents having solubility in water of less than 3 weight % and evaporation rate less than 0.01(butyl acetate evaporation rate=1.0) such as, for example, TEXANOL™ coalescent or plasticizers such as, for example, KP-140™ plasticizer and dibutyl phthalate at a level of 0% to 25%, by weight based on the dry weight of the waterborne polymer.

TABLE 1-0

COALESCENT PROPERTIES

| COALESCENT | SOLUBILITY IN WATER (g/100g; %) | EVAPORATION RATE (relative to nBuAc = 1) |
|---|---|---|
| 2,2,4-trimethyl-1,3 pentanediolmonoisobutyrate (TEXANOL ™) | Insoluble | <0.01 |
| Propylene Glycol Phenyl Ether | 1.1 | <0.01 |
| Heptyl Ester with C7 oxoalcohol,ester (EXXATE ® 700) | 0.01 | 0.08 |
| Octyl Ester with C8 oxoalcohol,ester (EXXATE ® 800) | 0.02 | 0.033 |
| Propylene Glycol Monobutyl Ether | 6.4 | 0.08 |
| Dipropylene Glycol Monobutyl Ether | 5.0 | 0.01 |
| Dipropylene Glycol tert-Butyl Ether | 12 | 0.015 |
| Propylene Glycol t-Butyl Ether (ARCOSOLV ® PTB) | 17 | 0.25 |
| Ethylene Glycol n-Butyl Ether | infinite | 0.07 |

Note: TEXANOL ™ is a trademark of Eastman Chemical Company. EXXATE ® is a trademark of Exxon Chemical Company.

The amount of pigment in the aqueous coating composition may vary from a pigment volume concentration (PVC) of 0 to 75 and thereby encompass coatings otherwise described, for example, as clear coatings, semi-gloss or gloss coatings, flat coatings, and primers.

Water soluble organic compounds which function as freeze/thaw or wet edge aids such as, for example, ARCOSOLV® NMP, Methyl CARBITOL®, and propylene glycol at a level of 0–20 lbs. per 100 gallons of aqueous coating may also be incorporated into the aqueous coating composition.

The aqueous coating composition is prepared by techniques which are well known in the coatings art. First, if the coating composition is to be pigmented, at least one pigment is well dispersed in an aqueous medium under high shear such as is afforded by a COWLES® mixer or, in the alternative, at least one predispersed pigment may be used. Then the waterborne polymer is added under low shear stirring along with other coatings adjuvants as desired. Alternatively, the waterborne polymer may be included in the pigment dispersion step. The aqueous coating composition may contain conventional coatings adjuvants such as, for example, emulsifiers, buffers, neutralizers, humectants, wetting agents, biocides, antifoaming agents, colorants, waxes, and anti-oxidants.

The solids content of the aqueous coating composition may be from 25% to 60% by volume. The viscosity of the aqueous polymeric composition may be from about 50 KU (Krebs Units) to 120 KU as measured using a Brookfield Digital viscometer KU-1; the viscosities appropriate for different application methods vary considerably.

The aqueous coating composition is applied in a single coat having a wet thickness sufficient that the coating will be at least 0.05 mm thick when dry. By single coat is meant that one wet layer is applied but multiple applications or layers may optionally be applied, that is, the single coat may be built up before substantial drying of any has occurred. Conventional coatings application methods such as, for example, brushing and spraying methods such as, for example, air-atomized spray, air-assisted spray, airless spray, high volume low pressure spray, and air-assisted airless spray may be used. Airless spray is preferred to achieve the desired film thicknesses. The aqueous coating composition may be applied to substrates such as, for example, wood, metal, plastics and cementitious substrates such as, for example, concrete, stucco, and mortar. Drying and, optionally curing, may be allowed to proceed under ambient conditions or may be achieved at higher than ambient temperatures such as, for example, at 40 C. to 200 C.

The following examples are presented to illustrate the invention and the results obtained by the test procedures.

EXAMPLE 1

Preparation of Aqueous Coating Compositions

The following coating composition was prepared using EXXATE®700 as coalescent as presented in Table 1-1. Coalescent amounts were varied as noted in Table 1-2.

TABLE 1-1

Aqueous Coating Composition for Airless Spray

| MATERIAL | Grams |
|---|---|
| GRIND | |
| Water | 34.0 |
| N-Methyl-2-Pyrrolidone | 10.0 |
| TAMOL ® 681 (35%) | 11.1 |
| Aqueous Ammonia (28%) | 1.0 |
| SURFYNOL ®104DPM | 2.0 |
| BYK-021 | 2.0 |
| TiPure ® R706 | 195 |
| Grind the above 15–20 min then add at lower speed | |
| Water | 5.0 |
| LETDOWN | |
| Acrylic Emulsion Polymer Tg = 40° C. (MAINCOTE ® HG-56) | 523.0 |
| Water | 46.0 |
| Aqueous Ammonia (28%) | 2.1 |
| Grind from above | 260.1 |
| EXXATE ® 700 | 40.0 |
| KP-140 | 10.0 |
| BYK ®-024 | 1.0 |
| Sodium Nitrite (15%) | 9.0 |
| HEUR Thickener | 24.0 |
| ACRYSOL ® RM12W/Water (50/50) | |
| Water | 23.0 |
| Pvc | 16.2 |
| Volume Solids | 39.66% |

Notes: ACRYSOL ® RM12W as supplied was diluted with water (50/50 by weight) prior to addition. SURFYNOL ® is a trademark of Air Products and Chemicals Co. BYK ™ is a trademark of Byk-Chemie USA. TiPure ® is a trademark of EI DuPont de Nemours Co. TAMOL ®, MAINCOTE ®, and ACRYSOL ® are trademarks of Rohm and Haas Co.

TABLE 1-2

Sample 1 and Comparative Samples A–C were prepared according to Table 1-1, with the following coalescent and thickener levels.

| Sample Coalescent (% BOP) | Comp. A | Comp. B | Comp. C | 1 |
|---|---|---|---|---|
| DPnB | 10% | — | — | — |
| DPtB | — | 10% | — | — |
| PnB | — | — | 15.3 | — |
| Exxate ® 700 | — | — | — | 15.3 |
| KP-140 | 3.8 | 3.8 | 3.8 | 3.8 |
| Acrysol RM12W Level (Dry Lbs/100 gals.) | 1.9 | 2.1 | 2.3 | 2.3 |

EXAMPLE 2
Evaluation of Film Thickness/Sag Resistance

Paints were applied to untreated aluminum using a multinotch applicator (a Lenetta Anti-sag Meter). The panels were immediately hung vertically with the drawdown stripes horizontal and with the thinnest stripe at the top (dried under the noted controlled temperature and humidity conditions). After drying in this position, the drawdown was examined and rated for sagging: the lowest (thickest) stripe that had resisted crossing the gap to touch the next lower stripe was selected for the rating.

TABLE 2-1

Performance versus coalescent

| Sample Coalescent | Comp. A DPnB | Comp. B DPtB | Comp. C PnB | 1 Exxate ® 700 |
|---|---|---|---|---|
| Film Formation (SBS,10 mil) | | | | |
| 45° F./75% RH (6 Hrs) 1 | Good | Good | Cracked | Good |
| 50° F./75% RH (6 Hrs) 2 | Good | Good | Sl. Cracks | Good |
| Dry Times 10 Mil Wet/Aluminum | | | | |
| Set Time | 36 min. | 32 min. | 32 min. | 26 min. |
| Tack free time | 102 min. | 71 min. | 47 min. | 35 min. |
| Dry-hard | 7.0 h | 7.0 h | 6.0 h | 7.0 h |
| Measured Dry Film Thickness (mils) | 2.1 | 2.1 | 2.1 | 2 |
| Hardness Development | | | | |
| 1 Day (Konig/Pencil) | 23.1(5B) | 21(5B) | 32.2(5B) | 24.5(5B) |
| 3 Days | 43.4(4B) | 32.9(5B) | 60.2(3B) | 44.8(3B) |
| 2 Weeks | 64.4(3B) | 5.1(5B) | 67.2(3B) | 61.6(2B) |
| Measured Dry Film Thickness (mils) | 2.1 | 2.1 | 2.1 | 2.0 |
| Sag Resistance (on Al) | | | | |
| Wet Mils @ 75° F./50% RH | 14 | 18–20 | 9–10 | >60 |
| Wet Mils @ 75° F./90% RH | 9 | 14–16 | 5–6 | 40–45 |

Sample 1 of this invention exhibits sag resistance superior to that of Comparative Samples A–C in a thick film application while drying at an acceptably rapid rate.

EXAMPLE 3
Effect of Thickener type

Aqueous coating composition, Comparative Sample D, was prepared according to the following formula using an hydrophobically modified alkali-soluble emulsion (HASE) thickener.

TABLE 3-1

Comparative Sample D

| MATERIAL | Grams |
|---|---|
| GRIND | |
| Water | 41.2 |
| N-Methyl-2-Pyrrolidone | 10.0 |
| TAMOL ® 1124 | 3.9 |
| Aqueous Ammonia (28%) | 1.0 |
| SURFYNOL ® 104DPM | 2.0 |
| BYK ™ 021 | 2.0 |
| TiPure ® R706 | 195 |
| Grind the above 15–20 min then add at lower speed | |

TABLE 3-1-continued

Comparative Sample D

| MATERIAL | Grams |
|---|---|
| Water | 5.0 |
| LETDOWN | |
| Acrylic Emulsion Polymer Tg = 40° C. (MAINCOTE ® HG-56) | 523.0 |
| Water | 46.0 |
| Aqueous Ammonia (28%) | 2.1 |
| Grind from above | 260.1 |
| EXXATE ® 700 | 40.0 |
| KP-140 | 10.0 |
| BYK-024 | 1.0 |
| Sodium Nitrite (15%) | 9.0 |
| HASE Thickener | 42.2 |
| ACRYSOL ® RM-5 (12% solids adjusted to pH = 8.7 with aq. NH3) | |
| Water | 4.8 |
| PVC | 16.2 |
| Volume Solids | 39.79% |

TABLE 3-2

Performance versus thickener type

| Sample Coalescent | Comp. D Exxate ® 700 | 1 Exxate ® 700 |
|---|---|---|
| Thickener | HASE | HEUR |
| KU Viscosity | 90 | 99 |
| pH | 8.7 | 8.7 |
| Sag Resistance (on Al) | | |
| Wet Mils; 75° F./50% RH | 12 | 50–60 |
| Wet Mils @ 75° F./90% RH | 8 | 40–45 |

Sample 1 of this invention containing a hydrophobically modified urethane thickener (HEUR) exhibits sag resistance superior to that of Comparative Sample D containing a hydrophobically modified alkali-soluble acrylic emulsion (HASE) thickener even when both contain coalescent having solubility in water of less than 3 weight % and evaporation rate of at least 0.01(butyl acetate evaporation rate= 1.0).

EXAMPLE 4
Aqueous Coating Composition Containing Curing Agent.

Compositions containing a hydroxy-functional emulsion polymer (waterborne polymer) and a isocyanate dispersion (curing agent), a two pack system, were prepared as per Table 4-1, Part A and Part B were mixed and evaluated for sag resistance as a function of time after mixing of the two components as per Table 4-2.

TABLE 4-1

Aqueous Coating Compositions. Sample 2 and Comparative Sample E

| | Comp. E (grams) | Sample 2 (grams) | Supplier |
|---|---|---|---|
| PART A | | | |
| Sandmill Grind the following ingredients | | | |
| Titanium Dioxide (TiPure ® R-706) | 23.3 | 23.3 | DuPont |

TABLE 4-1-continued

Aqueous Coating Compositions. Sample 2 and Comparative Sample E

|  | Comp. E (grams) | Sample 2 (grams) | Supplier |
|---|---|---|---|
| Victawet ® 35B | 0.15 | 0.15 | Akzo Chemicals |
| Tego Foamex ® 800 | 0.07 | 0.07 | Tego Chemie |
| Water | 43.04 | 43.04 | |
| Acrylic OH-function polymer (Maincote ® AU-28) | 57.02 | 57.02 | Rohm and Haas |
| Triethylamine | 0.08 | 0.08 | |
| Letdown with, added in order, with low shear mixing | | | |
| Exxate ® 700 | | 2.29 | Exxon Chemical |
| Arcosolv ® PTB | 3.14 | | Arco Chemical |
| HEUR (Acrysol ® RM-12W (50/50 in water)) | 1.12 | 1.12 | Rohm and Haas |
| HEUR (Acrysol ® QR-708) | 0.06 | 0.06 | Rohm and Haas |
| Isopropanol | 0.05 | 0.05 | |
| PART B | | | |
| Aqueous polyisocyanate (Bayhydur ® XP-7063) | 9.76 | 9.76 | Bayer Corp. |

TABLE 4-2

Evaluation of Sag Resistance

|  | Comp. E | Sample 2 |
|---|---|---|
| Sag Resistance (on Al) Wet Mils @ 75° F./50% RH | | |
| 1.5 hours after mixing | 30-35 | 40-45 |
| 4 hours after mixing | 30 | 40 |
| Wet Mils @ 75° F./85% RH | | |
| 1.5 hours after mixing | 35 | 45 |
| 4 hours after mixing | 30 | 40 |

Sample 2 of this invention containing a coalescent having solubility in water of less than 3 weight % and evaporation rate of at least 0.01(butyl acetate evaporation rate=1.0) exhibits thick film(high-build) sag resistance superior to that of Comparative Sample E not containing such a coalescent.

What is claimed is:

1. An aqueous coating composition comprising a waterborne polymer having a glass transition temperature from 0 C. to 70 C., a hydrophobically modified water soluble or water/water-miscible solvent-soluble urethane thickener, and a coalescent having solubility in water of less than 3 weight % and evaporation rate of at least 0.01(butyl acetate evaporation rate=1.0).

2. The composition of claim 1 wherein said waterborne polymer is an aqueous emulsion polymer.

3. The composition of claim 1 wherein said waterborne polymer comprises at least two first functional groups and wherein said aqueous coating composition further comprises a curing agent comprising at least two second functional groups, said first functional groups being reactive with said second functional groups.

4. A method for providing a high-build low-sag coating comprising
   forming an aqueous coating composition comprising a waterborne polymer having a glass transition temperature from 0 C. to 70 C., a hydrophobically modified water soluble or water/water-miscible solvent-soluble urethane thickener, and a coalescent having solubility in water of less than 3 weight % and evaporation rate of at least 0.01(butyl acetate evaporation rate=1.0);
   applying said composition to a substrate in a single coat having a thickness of at least 0.05 mm. when dried; and
   drying, or allowing to dry, said applied coating.

5. The method of claim 4 wherein said waterborne polymer is an aqueous emulsion polymer.

6. The method of claim 4 wherein said wherein said waterborne polymer comprises at least two first functional groups and wherein said aqueous coating composition further comprises a curing agent comprising at least two second functional groups, said first functional groups being reactive with said second functional groups.

* * * * *